United States Patent
Schaller

(10) Patent No.: US 10,357,836 B2
(45) Date of Patent: Jul. 23, 2019

(54) COMPENSATION DEVICE AND CLAMPING DEVICE FOR WORKPIECES EQUIPPED WITH A COMPENSATION DEVICE OF THIS TYPE

(71) Applicant: THE GLEASON WORKS, Rochester, NY (US)

(72) Inventor: Anton Schaller, Reichertshausen (DE)

(73) Assignee: THE GLEASON WORKS, Rochester, NY (US)

( * ) Notice: Subject to any disclaimer, the term of this patent is extended or adjusted under 35 U.S.C. 154(b) by 0 days.

(21) Appl. No.: 15/545,433

(22) PCT Filed: Jul. 28, 2015

(86) PCT No.: PCT/IB2015/001270
§ 371 (c)(1),
(2) Date: Jul. 21, 2017

(87) PCT Pub. No.: WO2016/132170
PCT Pub. Date: Aug. 25, 2016

(65) Prior Publication Data
US 2018/0001404 A1 Jan. 4, 2018

(30) Foreign Application Priority Data
Feb. 18, 2015 (DE) .......................... 10 2015 002 140

(51) Int. Cl.
*B23B 31/40* (2006.01)
*B23F 23/06* (2006.01)
*B23B 31/02* (2006.01)

(52) U.S. Cl.
CPC ............ *B23F 23/06* (2013.01); *B23B 31/025* (2013.01); *B23B 31/40* (2013.01); *B23B 2231/22* (2013.01)

(58) Field of Classification Search
CPC ... B23B 31/025; B23B 31/40; B23B 2231/22; B23F 23/06
(Continued)

(56) References Cited

U.S. PATENT DOCUMENTS 2,732,213 A * 1/1956 Drew .................. B23B 31/4006
279/156
3,083,976 A 4/1963 Stark
(Continued)

FOREIGN PATENT DOCUMENTS

WO 2011/059945 A1 5/2011

OTHER PUBLICATIONS

International Search Report and Written Opinion for PCT/IB2015/001270, ISA/EPO, dated Nov. 10, 2015, 10 pp.

*Primary Examiner* — Sunil K Singh
*Assistant Examiner* — Paul M Janeski
(74) *Attorney, Agent, or Firm* — Robert L. McDowell

(57) ABSTRACT

The invention relates to a compensation device for the flat-compensated clamping of a workpiece, in particular a toothed workpiece or a workpiece to be toothed, carried out via a clamping device defining a clamping axis, said workpiece having an axis of rotation and abutting a contact surface of the compensation device with a flat side, wherein the workpiece axis of rotation is coaxially centered to the clamping axis when the clamping device is actuated, and any deviations arising therefrom of the abutting flat side from an orthogonality to the workpiece axis of rotation are compensated by a deflection movement carried out at the compensation device, wherein the contact surface has at least three contact areas spaced apart from one another and the deflection movement comprises an axial movement of the contact areas.

12 Claims, 2 Drawing Sheets

Figure 1:
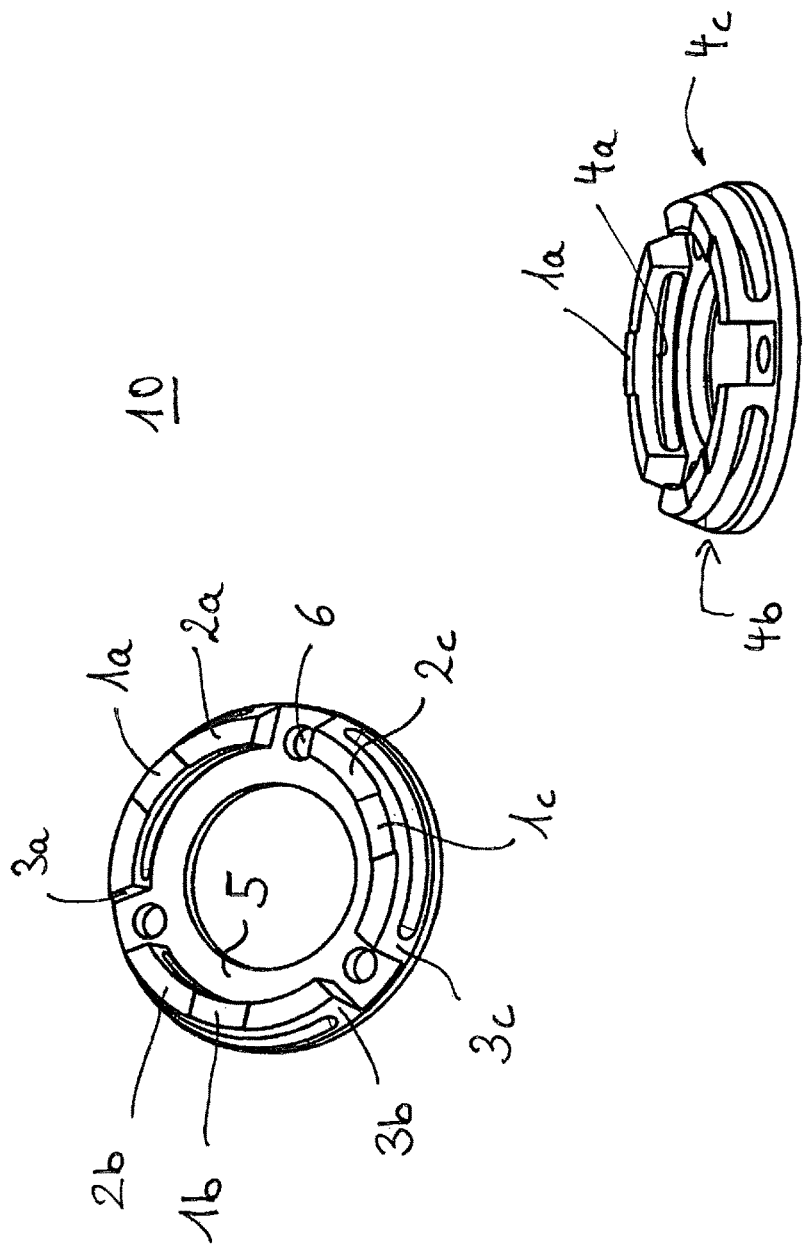

(58) Field of Classification Search
USPC .................. 279/156, 144, 136, 132, 133
See application file for complete search history.

(56) References Cited

U.S. PATENT DOCUMENTS

| | | | | |
|---|---|---|---|---|
| 3,143,907 A | * | 8/1964 | Ulrich | B23B 33/005 82/165 |
| 3,608,915 A | * | 9/1971 | Hohwart | B23B 31/4033 279/156 |
| 4,604,923 A | * | 8/1986 | Link | B23B 3/161 279/133 |
| 4,677,885 A | | 7/1987 | Schmid et al. | |

\* cited by examiner

COMPENSATION DEVICE AND CLAMPING DEVICE FOR WORKPIECES EQUIPPED WITH A COMPENSATION DEVICE OF THIS TYPE

The invention relations to a compensation device for the flat-compensated clamping of a work-piece, in particular a toothed workpiece or a workpiece to be toothed, carried out via a clamping device defining a clamping axis, said workpiece having an axis of rotation and abutting a contact surface of the compensation device with a flat side, the workpiece axis of rotation being coaxially centered to the clamping axis when the clamping device is actuated, and any deviations arising therefrom of the abutting flat side from an orthogonality to the workpiece axis of rotation being compensated by a deflection movement carried out at the compensation device.

Compensation devices of this kind are known, for example from the unpublished DE 10 2013 018 243. The need for such devices is demonstrated by the following considerations. If a workpiece of which the abutting flat side does not have any deviations from an orthogonality to the workpiece axis of rotation lies on a contact surface that is orthogonally abutting relative to the clamping axis, the workpiece axis of rotation and the clamping axis extend in parallel and are ultimately in line with the clamped workpiece with respect to the centering effect of the actuated clamping device. If, however, there are deviations on the abutting flat side of the workpiece from an orthogonality to the workpiece axis of rotation, which can occur, at least to a small extent, for example as a result of hardening distortions that are formed on the flat side, and said deviations are not corrected, the orientation of the workpiece axis of rotation deviates from that of the clamping axis such that, when actuating the clamping device, the centering effect thereof is in a competitive relationship with the fixed contact between the "oblique" flat side and the "straight" contact surface, which results in tilting during clamping and an inability to ensure the coaxiality of the workpiece axis of rotation and the clamping axis. Since the clamping axis is in line with the spindle axis of a workpiece spindle coupled to or intended to be coupled to the clamping device, this would lead to, albeit small, tumbling movements of the workpiece axis of rotation about the spindle axis when the workpiece is machined. In order to avoid this tumbling movement, the aforementioned compensation devices are used, which remedy the above-mentioned conflict situation in that, by means of a deflection movement, they allow contact between the flat side and the contact surface in the case of coaxial axes.

In DE 10 2013 018 243, the spatial position of the contact surface of the compensation device with respect to the clamping axis can be adjusted by means of tilting bearings comprising respective bearings and counter bearings and having two independent degrees of tilting freedom. A universal joint is formed by means of the two independent degrees of tilting freedom, and the deflection movement of the compensation device is therefore a superposition of two tilting movements. The compensation unit formed in DE 10 2013 018 243 by a mounting unit having the tilting bearing has the advantage over earlier compensation devices that are designed as a universal joint of maintaining the obtained toothing quality over the longest possible length of time.

The problem addressed by the present invention is that of improving a compensation device of the kind mentioned at the outset, in particular with respect to the caliber of the machining qualities of the machined workpieces, in particular the toothings thereof, that can be obtained.

This problem is solved by the invention by means of a development of the compensation device of the kind mentioned at the outset that is substantially characterized in that in that the contact surface has at least three contact areas spaced apart from one another and the deflection movement comprises an axial movement of the contact areas.

As such, the compensation device according to the invention is based on a completely different principle. The entire contact surface no longer tilts via (two) common tilting axes; rather, there is an axial movement of the individual contact areas, depending on the angular position of the workpiece having an uneven flat side, to an extent that is in each case necessary in order to achieve plane parallelism. In this manner, lateral displacements induced by the tilting movements in the prior art are remedied, and the clamping issue is limited to locally varying deflection movements with respect to only one (the axial) axis. In this manner, even more precise clamping with respect to optimized coaxiality of the workpiece axis of rotation and the clamping axis is achieved.

The clamping devices, which, in use, cooperate with the compensation device, are not restricted in terms of the clamping mechanism thereof in any particular way. The expansion clamping mandrel shown in FIG. 1 of DE 10 2013 018 243 may be used, for example, or other mechanisms, such as saw-tooth liners or Spiethsliners may also be used.

In a particularly preferred embodiment, the contact areas are resiliently mounted and the deflection movement is resiliently reversible. This allows for a lasting application with a reproduced reaction in response to the same boundary conditions, such as the size of axial clamping forces of the clamping device that occur.

In a particularly preferred embodiment, axially rigid areas are formed between the contact areas. In this manner, the compensation device benefits from an effect that supports the retention of the workpieces against axial forces. When viewed in an axial cross section through the axially rigid areas, the axially rigid areas are preferably formed continuously from one axial end to another axial end of the compensation device.

The orientation of the workpiece axis of rotation when in use of course depends on the orientation of the spindles used in the machine in question, for example a vertical orientation if this is a vertical machine or also a horizontal orientation if this is a horizontal machine (workpiece axes of rotation that are oblique in space are of course also possible). In the following, for reasons of clarity, in some instances the notion of a vertical spindle and clamping device is assumed; the contact surface would then be a resting surface and axially varying areas could be referred to as varying height levels.

Thus, in a particularly preferred embodiment it is provided that the contact areas project axially relative to an axial height level of the rigid areas. The difference in axial levels resulting therefrom is in this case preferably set depending on the maximum axial amplitude of the deflection movement that is expected to be required.

In a particularly preferred embodiment, a structural material weakness is provided axially below the contact areas. This allows resilience of the deflection movement caused by structural shaping and not by selecting a resilient material. The material weakness can comprise removing material.

It is thus is provided in particular that the material of the compensation device itself is not a flexible/resilient material such as rubber; in particular, it is provided that the compensation device is a mounting unit that is formed for example integrally and in particular is made of a hard material, such as preferably hardened steel. In preferred embodiments of this kind it is therefore provided that, in a notional compensation device in the form of a volume specified by the external dimensions of the compensation device, in the case of complete material filling of the volume with the material of the compensation device, effective, flat-compensating deflection movements would not be possible. Other hard materials can also be used instead of hardened steel; this should, however, result in a hard component.

In a particularly preferred embodiment, the deflection movement is carried out according to the beam bending principle. In this manner, the required deflection movements are possible, and the compensation device as a whole, in the clamped state of the workpiece, provides rigid support for the workpiece against axial machining forces.

It is therefore provided in particular that a beam that is in particular supported on both sides is associated with one contact area, in particular each of the contact areas, on which beams the contact area(s) are arranged, in particular in the center. The shape of the beam is not restricted in any particular way. In a projection towards the plane of the contact surface, a beam in the shape of a ring segment is preferred owing to the preferred design of the compensation device as a ring-shaped structure, as explained below. The vertical profile of the beam when viewed in a plane that is perpendicular thereto can preferably run at the same height level, the contact areas located at the center of the beam, for example, then being elevated with respect to the rest of the beam. In this connection, it is provided that the axially rigid areas include the beam support. In other words, the axially rigid areas and the beam together form a bridge structure when support is provided on both sides.

Particularly preferably, the position of one contact area remains unaffected by a deflection movement carried out at another contact area. In other words, the contact areas are mutually decoupled in terms of movement. The movement decoupling naturally allows for the contact areas, owing to an external force, such as the axial clamping force acting on the compensation device for example via the workpiece by means of the clamping device, which means that a plurality or all the contact areas perform a deflection movement. Rather, the movement decoupling indicates that, when considering the punctual loading of a contact area, which leads to deflection movements, there is no movement in another contact area, as is the case for instance in compensation devices having a universal joint.

The compensation device expediently has a ring-shaped structure. The central through-hole of the ring-shaped structure can thus be penetrated by a clamping mandrel of a clamping device. Owing to the ring-shaped structure, the above-mentioned beams can have an extension in the circumferential direction, measured over the extension angle, that is greater than 40°, preferably greater than 60° and no greater than 120°. It is in particular provided that the free length of the beam is no greater than 100°, in particular no greater than 90°, in order to leave sufficient angular space for the axially rigid areas.

In addition, it is preferably provided that the ring-shaped structure has a rotational symmetry in the form of a $2\pi/n$ rotational symmetry, n being the number of contact areas of the contact surface. More generally, it is preferable for the contact areas to be arranged so as to be azimuthally equidistant. Particularly preferably, the compensation device has precisely three contact areas spaced apart from one another, which, when viewed on their own, form in particular continuous contact surfaces. Good results can also be achieved using for example four areas; preferably the number of contact areas ought not to exceed eight, in particular six.

In a preferred embodiment, the compensation device has, on the side thereof remote from the contact, a ring-shaped base plate of which the ring thickness extending orthogonally to the axial direction is greater than that of the contact areas/beams, in particular by at least 30 percent, preferably by at least 60 percent. The individual contact areas, alongside the bearings thereof, are interconnected by means of the ring-shaped base plate. A common ring-shaped support plate for the contact with the clamping device is also formed by said base plate. The respective bearings of the contact areas of the contact surface for the flat side of the workpiece are preferably axially at the same height (in the unloaded state). In addition, it is preferable for azimuthal areas of the compensation device to only consist of the ring-shaped base plate, as a result of which isolation of the individual contact areas from one another is reinforced.

The compensation device expediently has fixing areas in order to be fixed to a clamping device/spindle. These can be provided in the form of axial through-holes, for example, which in turn can be arranged in the areas of the compensation device in which only the ring-shaped base plate is provided.

The invention also protects the use of a compensation device having one or more of the above-described features for a clamping device and/or spindle that is used for a rotatably driven bearing of a workpiece having a toothing or to be provided with a toothing.

In addition, the invention also protects a clamping device for clamping a workpiece of this kind, which device is equipped with a compensation device according to one of the above-mentioned aspects, as well as a spindle arrangement comprising such a clamping device.

Preferably, material properties and dimensions of the beam are, in particular for a two-sided beam support, aligned with the force from the clamping apparatus acting on a resting area during clamping such that the product of the modulus of elasticity of the beam and the geometrical moment of inertia thereof divided by the cube of the beam length is smaller than the force K divided by 2.5 mm, more preferably smaller than 70 percent of this value, even more preferably smaller than 40 percent of this value, in particular, however, greater than 5 percent of this value, more preferably greater than 10 percent of this value. For in particular one-sided beam supports, these alignments can be employed with an additional factor of 16 for the condition in question (i.e. smaller than 16 times the force 16 K divided by 2.5 mm).

Figure 2:
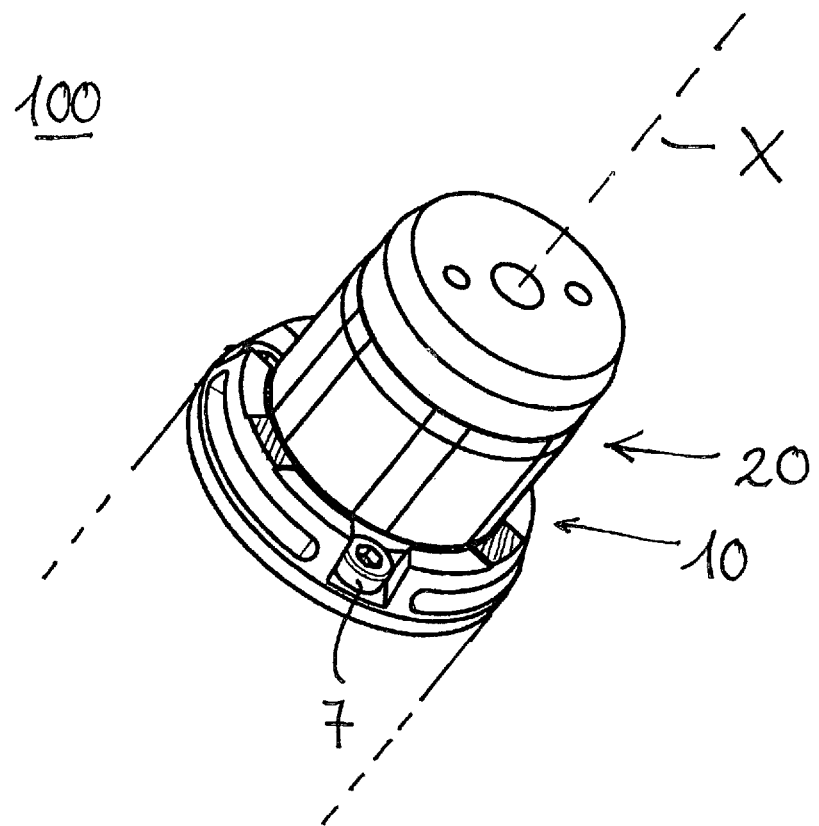

Additional features, particularities and advantages of the invention result from the following description of the attached drawings, in which FIG. 1 shows two different perspective views of a compensation device, and FIG. 2 shows the compensation device from FIG. 1 mounted on an area of a clamping device.

In the following, an embodiment of the invention will be described in which the compensation device is a contact ring denoted by reference sign 10. The contact ring 10 has a flat, ring-shaped base 5 that is penetrated by mounting holes 6 at three azimuthally equidistant points. By virtue of the mounting holes 6, the contact ring 10 can be fixed to a clamping apparatus 100 for example by means of studs 7 and threaded bores in the clamping apparatus 100 that are provided coaxially relative to the mounting holes 6. In this case, a clamping mandrel 20 of the clamping apparatus 100 penetrates the interior of the contact ring 10 (FIG. 2).

Walls that are substantially in the shape of a circular segment are erected between the mounting holes 6 at the outer periphery of the base 5, which walls are, however, penetrated by continuous radial slots 4a, 4b, 4c such that the axially upper areas of the respective walls each form a beam 2a, 2b, 2c that is supported on both sides by a pair of support columns 3a, 3b, 3c. A rest 1a, 1b, 1c is formed at the center of each beam 2a, 2b, 2c, which rest projects axially relative to the rest of the axial beam height by 0.2 mm in this embodiment, and on which rests the flat side of a workpiece, such as a gear or an as yet untoothed gear blank abuts or rests, insofar as the clamping axis x, which extends orthogonally to the base 5 in the center thereof, is oriented vertically. A "three-point bearing" of the workpiece therefore takes place by means of the three contacts 1a, 1b and 1c.

Owing to the mutually decoupled bridge-like support structures for the rests 1i formed by the columns 3i, 3i and the beam 2i (i=a, b, c), in the case of axial loading, the rests 1i can perform a deflection movement according to the beam bending principle independently of the other rests 1j. If the flat side of a workpiece deviates from an orthogonal position/orientation relative to the workpiece axis of rotation, this leads to axial loads when clamping the workpiece by means of the clamping apparatus 100, which loads are compensated by corresponding axial deflection movements by the respective beam bending processes of correspondingly different amplitudes, which lead to the workpiece axis of rotation ultimately being coaxial relative to the clamping axis when the workpiece is clamped. It is recognized that, for example in the case of an axial deflection movement, viewed in isolation, of contact 1c by bending the beam 2c supported by the columns 3c, there is no upward or downward movement of the other contacts 1a, 1b owing to the decoupling of the respective segments of the contact ring 10.

Following release by the clamping apparatus 100, the previously loaded beams 2i return to their initial position. The deflection movement of the contacts 1i is thus based not on a flexibility of material, but on the structural properties of the contact ring 10, in particular the bridge structure 3i-2i-3i owing to the structural weakness resulting from the slots 4i.

In the case of a one-sided support (not shown), the resting areas could also be arranged at the free end of the beam, for example.

The contact ring 10 is in this case made of a hard material such as hardened steel. While a workpiece is clamped by the contact ring 10, the contact ring 10 provides not only flat compensation, which could also be achieved simply with a foam ring for example, but also rigid support of the clamped workpiece as an additional support against axial loads, as well as a component exhibiting high durability.

The invention is not limited to the features set out in the embodiment. Rather, the features in the following claims and the preceding description are essential both individually and in combination to the realization of the invention in its various embodiments.

The invention claimed is:

1. A compensation device (10) for the flat-compensated clamping of a workpiece, said workpiece comprising a toothed workpiece or a workpiece to be toothed, the clamping being carried out via a clamping device (100) defining a clamping axis (X), said workpiece having an axis of rotation and abutting a contact surface (1) of the compensation device with a flat side, the workpiece axis of rotation being coaxially centered to the clamping axis (X) when the clamping device (100) is actuated, and any deviations arising therefrom of the abutting flat side from an orthogonality to the workpiece axis of rotation being compensated by a deflection movement carried out at the compensation device (10), characterized in that the contact surface (1) has at least three contact areas (1a, 1b, 1c) spaced apart from one another and the deflection movement comprises an axial movement of the contact areas (1a, 1b, 1c), wherein axially rigid areas (3a, 3b, 3c) are formed between the contact areas (1a, 1b, 1c) and wherein the contact areas (1a, 1b, 1c) project axially relative to an axial height level of the rigid areas (3a, 3b, 3c) and wherein the position of one contact area (1a, 1b, 1c) remains unaffected by a deflection movement carried out at another contact area (1b, 1c; 1a, 1c; 1a, 1b).

2. Compensation device according to claim 1, wherein the contact areas (1a, 1b, 1c) are resiliently mounted and the deflection movement is resiliently reversible.

3. Compensation device according to claim 1 wherein a structural material weakness (4a, 4b, 4c) is provided axially below the contact areas.

4. Compensation device according to claim 1 wherein the material of the compensation device is not flexible and the compensation device is an integral mounting unit.

5. Compensation device according to claim 1 wherein the deflection movement is carried out according to the beam bending principle.

6. Compensation device according to claim 5, wherein a beam (2a, 2b, 2c) that is supported on both sides is associated with each of the contact areas (1a, 1b, 1c), on which beams said contact areas are arranged in the center.

7. Compensation device according to claim 6 wherein the axially rigid areas (3a, 3b, 3c) include the beam support.

8. Compensation device according to claim 1 having a ring-shaped structure.

9. Compensation device according to claim 1 wherein the compensation device has a ring-shaped base plate (5) on the side thereof remote from the contact, the ring thickness of which plate, extending orthogonally to the axial direction, is greater than that of the contact areas (1a, 1b, 1c)/beams (2a, 2b, 2c).

10. Compensation device according to claim 1 wherein the compensation device has fixing areas in the form of axial through-holes (6).

11. Clamping device for clamping a toothed workpiece or a workpiece to be toothed, comprising a compensation device according to claim 1.

12. Spindle arrangement comprising a clamping device according to claim 11.

* * * * *